United States Patent [19]
Berg

[11] Patent Number: 5,920,607
[45] Date of Patent: Jul. 6, 1999

[54] ADAPTIVE WIRELESS CELL COVERAGE

[75] Inventor: Myron Berg, Colorado Springs, Colo.

[73] Assignee: MCI Communications Corporation, Washington, D.C.

[21] Appl. No.: 08/581,727

[22] Filed: Dec. 29, 1995

[51] Int. Cl.[6] .............................. H04M 1/24; H04M 3/08; H04M 3/22
[52] U.S. Cl. .................................. 379/1; 379/29; 379/32; 370/241; 455/67.1; 455/67.3
[58] Field of Search ............................. 379/1, 2, 5, 9–10, 379/14–20, 24, 26, 27, 28, 34, 29, 58–64, 269, 279, 15, 32; 455/8, 9, 16, 17, 34.1, 53.1, 67.1, 67.3, 67.4; 370/216, 341, 343, 217, 221, 241, 244, 245, 250

[56] References Cited

U.S. PATENT DOCUMENTS

| | | | |
|---|---|---|---|
| 5,097,499 | 3/1992 | Costentino | 379/59 |
| 5,129,098 | 7/1992 | McGirr et al. | 455/69 |
| 5,152,002 | 9/1992 | Leslie et al. | 455/11.1 |
| 5,179,721 | 1/1993 | Comroe et al. | 455/33.1 |
| 5,230,082 | 7/1993 | Ghisler et al. | 455/33.2 |
| 5,274,838 | 12/1993 | Childress et al. | 455/53.1 |
| 5,295,180 | 3/1994 | Vendetti et al. | 379/59 |
| 5,313,654 | 5/1994 | Comroe et al. | 455/33.1 |
| 5,315,637 | 5/1994 | Breeden et al. | 379/58 |
| 5,321,735 | 6/1994 | Breeden et al. | 379/58 |
| 5,541,978 | 7/1996 | Brunner et al. | 370/336 |
| 5,566,225 | 10/1996 | Hass | 379/58 |
| 5,794,128 | 8/1998 | Brockel et al. | 455/67.1 |

OTHER PUBLICATIONS

Remondino et al., "An Expert System for Radio Mobile Network Monitoring," IEEE Intl. Conference on Communications '93, Geneva, May 23–26, 1993, vol. 3 of 3, pp. 1885–1889.

A. Koolwine, "Integrated Network Management at B.C. Cellular: A Practical Application," Annual Review of Communications, Chicago, IL, Jan. 1, 1992, vol. 46, pp. 1020–1031.

H. Halamek et al., "Zellgrenzdetektion mit relativer Entfernungs–messung im Netz C –Detecting the Limits of a Cell with Relative Range Measurement in the C Network," *Funk–Technik*, vol. 41, No. 4, 1986, pp. 146–149.

*Primary Examiner*—Curtis A. Kuntz
*Assistant Examiner*—Binh K. Tieu

[57] ABSTRACT

A system and method for controlling a wireless network such that degradation of service availability is reduced or eliminated. The present invention monitors a wireless network. In response to a network degradation, the present invention adjusts setup parameters of network equipment. The adjustment automatically adapts the network equipment in real-time or near real-time to reduce or eliminate the degradation. The present invention is preferably automated, thereby increasing the speed of network adaption.

28 Claims, 5 Drawing Sheets

ADAPTIVE WIRELESS CELL COVERAGE

BACKGROUND OF THE INVENTION

1. Field of the Invention

The present invention relates generally to wireless cellular network systems. More particularly, the present invention relates to automatically allocating resources in an adaptive manner to reduce or eliminate the effect of a degradation of a wireless cellular network.

2. Related Art

Currently, wireless telephony services do not provide the same service availability as wireline telephony services. However, wireless telephony services are beginning to replace wireline telephony services. Users of the new wireless telephony services will expect little, if any, change in service availability as a result of the transition to the new technology. As a result, wireless telephony must improve service availability and quality, and ultimately match or exceed that provided by wireline telephony services. Wireless and cellular are used interchangeably throughout this specification.

When viewed from a user's perspective, improvement must occur in the areas of network availability, probability of call success, coverage reliability, and speech and data quality. With respect to network reliability, wireless networks must provide highly available wireless services. In terms of service availability, users will expect availability to equal or exceed that of wireline services. To improve the probability of call success, network caused service degradation must be minimized. The minimization can be measured by a decrease in blocked or dropped calls due to cell congestion, failed equipment, and other service provider problems. With respect to coverage reliability, users will expect service to be consistently available. With respect to speech and data quality, service quality must improve such that calls made from mobile equipment are no longer noticeably degraded.

Wireless networks face a variety of degradation sources that change a wireless network's status. These degradation sources impede the required improvements in service quality. Degradation sources include changes in network equipment availability, changes in user traffic patterns, and changes in radio propagation. Although modern technological advances have produced adjustable network equipment that is more adaptable to changes in a wireless network's status, control mechanisms have not been developed to organize and control the equipment's response to such changes. What is required, therefore, is a network control mechanism that supports adaption of radio coverage in response to the changes in a wireless network's status.

SUMMARY OF THE INVENTION

The present invention is directed to a system and method for controlling a wireless network such that degradation of service availability is reduced or eliminated. The present invention monitors a wireless network. In response to a network degradation, the present invention adjusts setup parameters of network equipment. The adjustment automatically adapts the network equipment in real-time or near real-time to reduce or eliminate the degradation. The present invention is preferably automated, thereby increasing the speed of network adaption. The increased adaption speed reduces or eliminates interruptions of service to users.

The preferred embodiment of the present invention detects a degradation of a wireless network. In response, the present invention assesses the impact of the degradation to the network. After the impact is assessed, the present invention identifies potential corrective actions to reduce the impact of the detected degradation. The present invention uses network monitoring data to evaluate the performance of a wireless network. Because wireless network adaption is a very complex undertaking, it is often best implemented in several iterations. Accordingly, the present invention repeats the assessment of network impact, identification of potential corrective action, and implementation. The repetition can continue for a set period of time, a certain number of iterations, or until a predetermined performance level is reached.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

The present invention is directed to a system and method for controlling a wireless network such that degradation of service availability is reduced or eliminated. The present invention monitors a wireless network. In response to a network degradation, the present invention causes the network equipment to adapt to reduce or eliminate the degradation. The present invention is preferably automated, thereby increasing the speed of network adaption.

Figure 1:
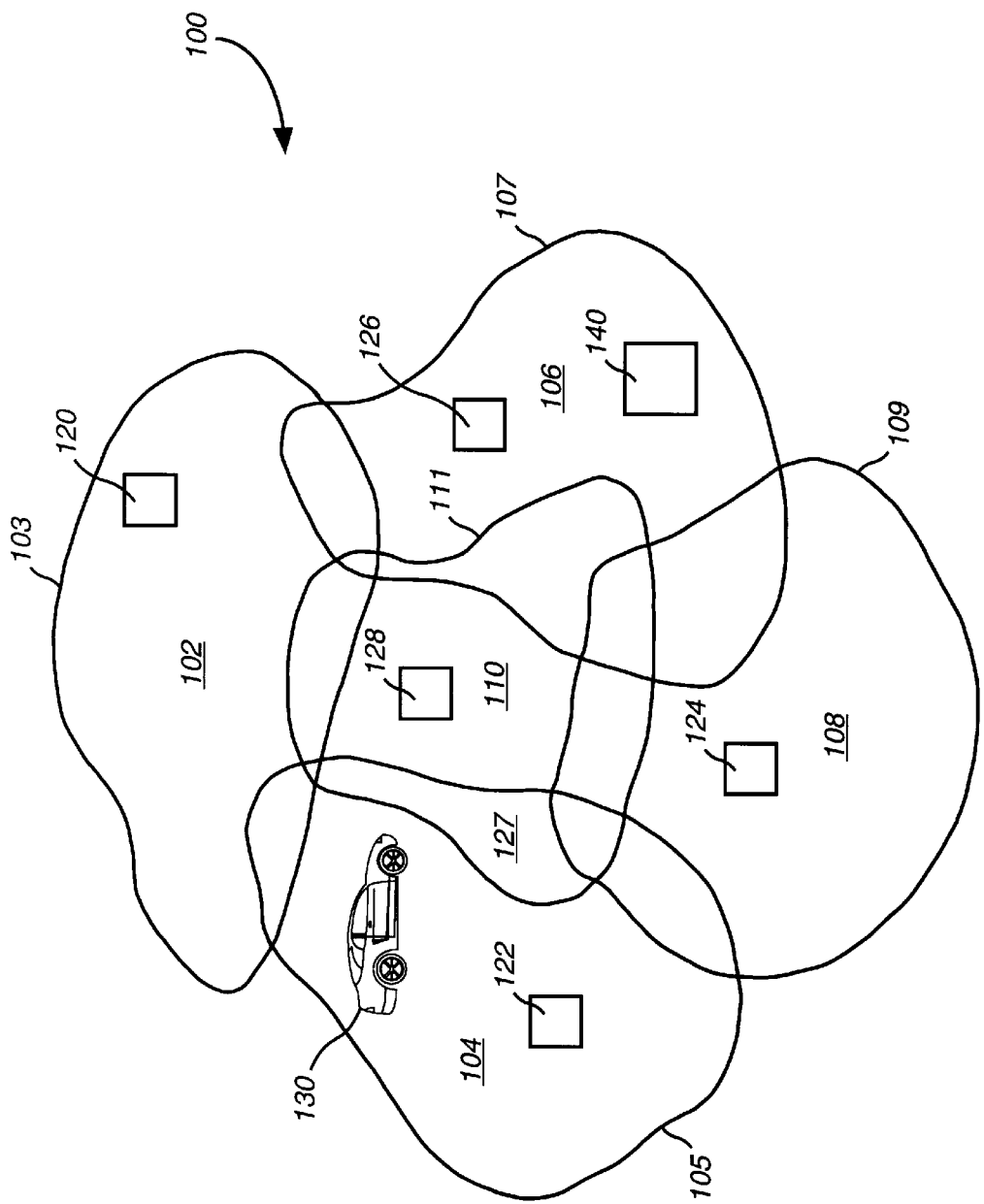
FIG. 1 illustrates a wireless network 100.

FIG. 1 illustrates a wireless network 100. The wireless network comprises cells 102, 104, 106, 108, and 110. Each cell comprises a communication device 120, 122, 124, 126, and 128. The communication device is preferably a transceiver having a receiver component and a transmitter component. Transceivers are well known in the art. According to a preferred embodiment of the present invention, the receiver component can receive a call from a user 130. Upon receipt of the call, the receiver component allocates a free channel, if one exists, to service the call. A channel is preferably a frequency which is allocated to handle the call. The transmitter component transmits the call to a control center 140 (discussed below).

Preferably each transceiver 120, 122, 124, 126, and 128 of wireless network 100 can remotely indicate its status. In a preferred embodiment of the present invention, each transceiver 120, 122, 124, 126, and 128 of wireless network 100 remotely indicates its status to a control center 140

(discussed below). In addition to remotely indicating its status, each transceiver 120, 122, 124, 126, and 128 can be remotely controlled. In a preferred embodiment of the present invention, each transceiver 120, 122, 124, 126, and 128 is remotely controlled by a control mechanism 200 (discussed below) in the control center 140.

The transceiver defines a cell's "footprint." In FIG. 1, the cell's footprint is illustrated by the boundary of cells 102, 104, 106, 108, and 110. In FIG. 1, the boundaries 103, 105, 107, 109, and 111 correspond to cells 102, 104, 106, 108, and 110 respectively. A particular cell's footprint defines the limits in which users can communicate with the wireless network 100 via the particular cell. For example, user 130 can communicate with transceiver 122 anywhere within the footprint defined by the boundary 105 of cell 104. As FIG. 1 illustrates, each cell's footprint can have an irregular shape. In addition, each cell's footprint can be different from each other cell's footprint. Furthermore, one cell's footprint can overlap one or more other cell's footprints.

Another term, closely related to footprint is coverage area. In this specification, the term "coverage area" means the actual coverage, i.e., logical coverage, provided by a cell. Thus, the coverage area can be thought of as a "virtual" footprint. That is, a cell's coverage area can be changed without modifying the cell's footprint. For example, a cell's coverage area may be changed by modifying handoff parameters such that a call is handed off prior to leaving the footprint of a cell. Thus, a cell's footprint defines the maximum area of a cell's coverage area.

Wireless network 100 preferably has a control center 140. The control center 140 connects the wireless network 100 to a telephone network (not shown). The control center 140 provides monitoring and control capabilities for the wireless network 100. The monitoring capabilities of the control center 140 include assessing the status of equipment in wireless network 100, analyzing user traffic patterns, processing user inputs, and assessing special events and emergency usage. The control capabilities of control center 140 include allocating channels (i.e., frequencies to handle user calls), controlling power, changing cell direction and/or width, and updating "handoff" parameters. The present invention is preferably implemented in control center 140 as a control mechanism 200 (described below with reference to FIG. 2) to monitor the network 100 and adapt it for changing conditions.

When a user 130 makes a call from cell 104 in wireless network 100, the transceiver 122 allocates a free channel, if one exists, to the call. The transceiver then transmits the call to the control center 140. The control center 140 connects the call to a telephone system (not shown).

If the user 130 moves from cell 104 to another cell while the user's call is pending, the call is transferred from transceiver 122 to a transceiver in the new cell. The transfer process is known as "handoff." For example, if the user 130 travels from cell 104 to cell 110, the call is handed off from transceiver 122 to transceiver 128. To avoid discontinuity in call service, the call is preferably handed off in an area of overlap 127 between the coverage of cells 104 and 110. The handoff process is preferably controlled in the control center 140.

A wireless network 100 can provide service to many users. Each user requires preferably a separate channel over which a call is processed. Channels are preferably allocated by giving each user a separate frequency to handle a call.

The control center 140 includes the capability to remotely monitor and control the transceivers 120, 122, 124, 126, and 128 in wireless network 100. In the preferred embodiment of the present invention, this capability is included in a control mechanism 200 (described below with reference to FIG. 2). By remotely monitoring and controlling the transceivers in wireless network 100, the control center 140 can determine the status of the wireless network 100 and adapt it to changing conditions. The control center 140 also monitors other factors including customer feedback (e.g., comments and complaints), special event scheduling, traffic pattern fluctuations, and emergency situations to provide optimal control of the transceivers 120, 122, 124, 126, and 128 in wireless network 100.

Figure 2:
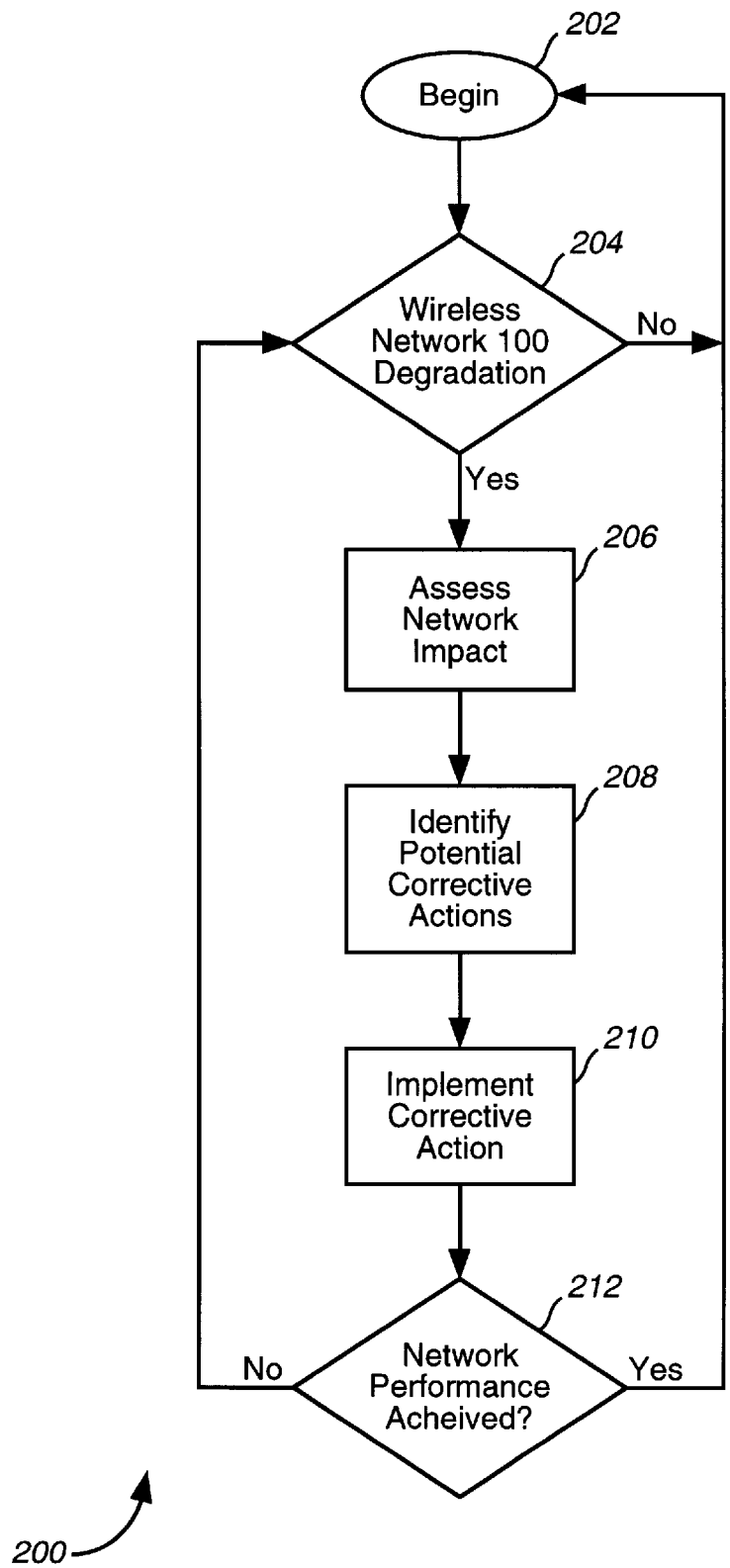
FIG. 2 is a control mechanism 200 for performing a preferred embodiment of the present invention.

FIG. 2 illustrates a control mechanism 200 according to a preferred embodiment of the present invention. The control mechanism 200 begins in "begin" step 202. From "begin" step 202, the control mechanism 200 immediately proceeds to step 204. In step 204, the control mechanism determines if there is a degradation in wireless network 100. If there is no degradation, the control mechanism returns to "begin" step 202.

A network degradation of wireless network 100 can arise from a variety of sources. These sources include network and equipment failure, cell maintenance, changes in user traffic patterns, and environmental effects. Network failures include loss of connectivity between a wireless network 100 and particular transceiver locations. Equipment failures include malfunctions at transceiver cites. Failures in a wireless network 100 are also referred to as faults. Scheduled cell maintenance degrades a wireless network 100 by making cells unavailable for allocation to users. Changes in user traffic patterns can be caused by user mobility and temporal changes in user demand. Network degradation may result from planned special events, e.g., sporting events and conventions, daily traffic fluctuations, e.g., rushhour versus non-rushhour, and unplanned fluctuations, e.g., emergencies or radio promotions. Environmental effects include atmospheric changes and foliage fluctuations due to seasonal changes.

If the control mechanism 200 determines that there has been a degradation of wireless network 100, the control mechanism 200 proceeds to step 206. In step 206, the control mechanism assesses the network impact of the network degradation detected in step 204. The assessment of network impact is accomplished through a variety of performance inputs. The performance inputs include traffic performance indicators to determine how the wireless network 100 is affected by user traffic patterns, equipment alarms that indicate equipment failures, remote radio test equipment to determine the effectiveness of cell coverage, and user inputs that indicate where users are actually experiencing service problems. Such user inputs can be user feedback including user complaints regarding call service.

After assessing the impact of a degradation on the wireless network 100, the control mechanism 200 proceeds to step 208. In step 208, the control mechanism 200 identifies potential corrective actions. Potential corrective actions include cell site controls, "soft" controls, and distribution of frequencies.

Cell site controls adjust parameters in transceivers 120, 122, 124, 126, and 128 to physically change the footprint of cells 102, 104, 106, 108, and 110 in a wireless network 100. That is, cell site controls modify the shape of boundaries 103, 105, 107, 109, and 111. According to a preferred embodiment of the present invention cell site controls can operate on none, one, or more than one transceiver 120, 122, 124, 126, and 128 in wireless network 100.

Cell site controls include controlling power output, the cell direction, and the cell width of a transceiver 120, 122, 124, 126, and 128 in wireless network 100. The net effect of controlling transceiver power output is preferably a proportional increase or decrease in the size of the cell footprint. Controlling cell direction adjusts the angle of coverage relative to a particular cell site antenna. For example, current antennae allow the centerline of a cell to be adjusted from 60 degrees to 45 degrees. Another type of cell site control is control of cell width. Current antennae allow the cell width to be adjusted from a 60 degree sector to a 90 degree sector. A sector is the angle subtended by an antennae's main lobe in its radiation pattern. Increasing a cell's width effectively increases the cell's footprint. Thus, by controlling power output, cell direction, and cell width, the control mechanism 200 is able to adapt the physical footprint of the cells 102, 104, 106, 108, and 110 in the wireless network 100 to provide optimal coverage to meet user demand.

In addition to identifying corrective actions that change the physical footprint of cells in a wireless network 100, the control mechanism 200 can identify "logically" changing a cell's footprint. Logically changing a cell's footprint refers to changing the cell's coverage area without modifying the cell physically. As described above, a cell's coverage area can be thought of as its "virtual" footprint. The coverage area is controlled by controlling handoff parameters. Handoff occurs when a user and the user's associated call move from a first cell to a second cell. Handoff refers to the transceiver in the first cell relinquishing control of the call to the transceiver in the second cell. Handoff parameters include controlling where in a cell handoff occurs and providing channel allocation in the second cell. By adjusting, handoff parameters, therefore, a cell's coverage area is modified, without physically modifying the cell.

In addition to changing a cell's footprint, either physically or virtually, the control mechanism 200 can identify the corrective action of modifying distribution of frequencies for handling calls. Thus, control mechanism 200 can allocate scarce frequency resources to cells 102, 104, 106, 108, and 110 in response to changing wireless network 100 requirements. Control mechanism 200 must consider the type of communication technology used in wireless network 100. For example, code division multiple access (CDMA), time division multiple access (TDMA), and frequency division multiple access (FDMA) modulation schemes impose different frequency reuse restrictions for adjacent cells on control mechanism 200. Frequency reuse refers to using the same frequency channels in nearby cells.

There are two primary types of frequency distributions that are available to control mechanism 200. The first is frequency addition. Frequency addition adds one or more frequencies in one or more cells to supplement normal wireless network 100 operation as user traffic warrants. Frequency addition requires that transceivers 120, 122, 124, 126, and 128 have sufficient capacity to reserve frequencies for such additional use requirements.

The second type of frequency distribution is frequency reallocation. Frequency reallocation involves redistributing frequencies across cells in wireless network 100 in response to changing user traffic. For example, frequencies may be added from nearby cells to reduce the blocking if a particular cell blocks traffic is due to inadequate frequencies. The control mechanism 200 must resolve frequency reuse restrictions for any cells affected by the frequency reallocation.

After identifying potential corrective actions in step 208, the control mechanism proceeds to step 210. In step 210, the control mechanism implements a corrective action. The implementation can include implementation of one of the identified potential corrective actions or a combination of the identified potential corrective actions.

Digital transceivers are becoming more common in cellular systems. The digital transceivers provide a large number of control parameters for cellular operators to adjust. The parameters control cell footprint, cell coverage area, handoff operation, and frequency usage. Each of the above disclosed corrective actions requires the control mechanism 200 to adjust a large number of transceiver parameters to implement a particular identified corrective action. For example, handoff control in a Global System for Mobile Communications (GSM) system can require adjustment of more than 40 parameters. GSM is a European originated digital cellular system that is being deployed in the U.S. It would be a daunting, if not impossible, task for a human operator to make the required adjustments. Even if a human operator could make the required adjustments, the adjustments would take too much time, and be too susceptible to error to be practical. In fact, a human could not keep up with changing network conditions. This, however, is the current state of conventional cellular systems. As a result, in conventional cellular systems, calls are often dropped or never initiated.

To overcome the efficiency problems associated with human operators, the control mechanism 200 is preferably implemented in computer software or as a hardware state machine. Equipment status inputs are provided by newer equipment which can communicate with the control mechanism 200. The control mechanism 200 can also control newer equipment. Thus, the control mechanism 200 is able to process inputs from and generate control outputs to equipment in the wireless network 100. Because the control mechanism 200 is fully automated, the system works extremely fast, and can provide an update of the wireless network in a matter of seconds, not minutes or days.

In an alternative embodiment of the present invention, the system is only partially automated. The control mechanism 200 can provide, for example, a manual override, so that the network is not operating in a completely closed-loop manner. In the alternative embodiment, the control mechanism 200 can make suggestions to a human operator concerning the corrective action to implement. Though partially automated adaption is slower than fully automated adaption, partially automated adaption permits human verification prior to implementing actions.

After a potential corrective action is implemented in step 210, the control mechanism 200 proceeds to step 212. In step 212, the control mechanism 200 determines if a predetermined performance level has been achieved. The predetermined performance level is a measure of the ability of wireless network 100 to handle actual and expected call traffic. The predetermined performance level may be determined in various ways. For example, in one embodiment of the present invention, the predetermined performance level is measured by a percentage of equipment available to the wireless network 100. In another embodiment of the present invention, the predetermined performance level is measured by the rate of user complaints. In yet another embodiment of the present invention, the predetermined performance level is measured by a wireless network 100 computer simulation (discussed below). As would be apparent to one skilled in the art to which the present invention pertains, these are but a few of the ways in which a predetermined performance level can be measured.

If the predetermined performance level has been achieved, the control mechanism proceeds to "begin" step 202. In step 202, the process repeats. The control mechanism 200 looks for new degradations on wireless network 100. If the predetermined performance level has not been achieved, the control mechanism 200 proceeds to step 204, whereupon further adaption is performed to handle the current wireless network 100 degradation.

A computer simulation of the cellular network can be used in conjunction with the present invention. The computer simulation is a mathematical model of wireless network 100. The mathematical model can execute potential corrective actions to substantially simulate their effect on the wireless network 100.

A corrective action can be applied to the computer simulation to determine if the corrective action partially or completely remedies the detected degradation of the wireless network 100. In a preferred embodiment of the present invention, the computer simulation provides a numerical metric of the performance of the wireless network in response to the applied corrective action. The numerical metric can be compared against a predetermined value. If the numerical metric is greater than the predetermined value, the control mechanism 200 implements the corrective action. If the numerical metric is less than the predetermined value, the corrective action is not implemented. Alternatively, if the numerical metric is less than the predetermined value, the corrective action is implemented, and additional corrective actions are determined. By comparing the operation of the wireless network 100 to a computer simulation of its operation, time and equipment resources can be optimally used. This is because resource allocations are modified only when the control mechanism 200 determines such modification to be beneficial to the operation of the wireless network 100.

Figure 3:
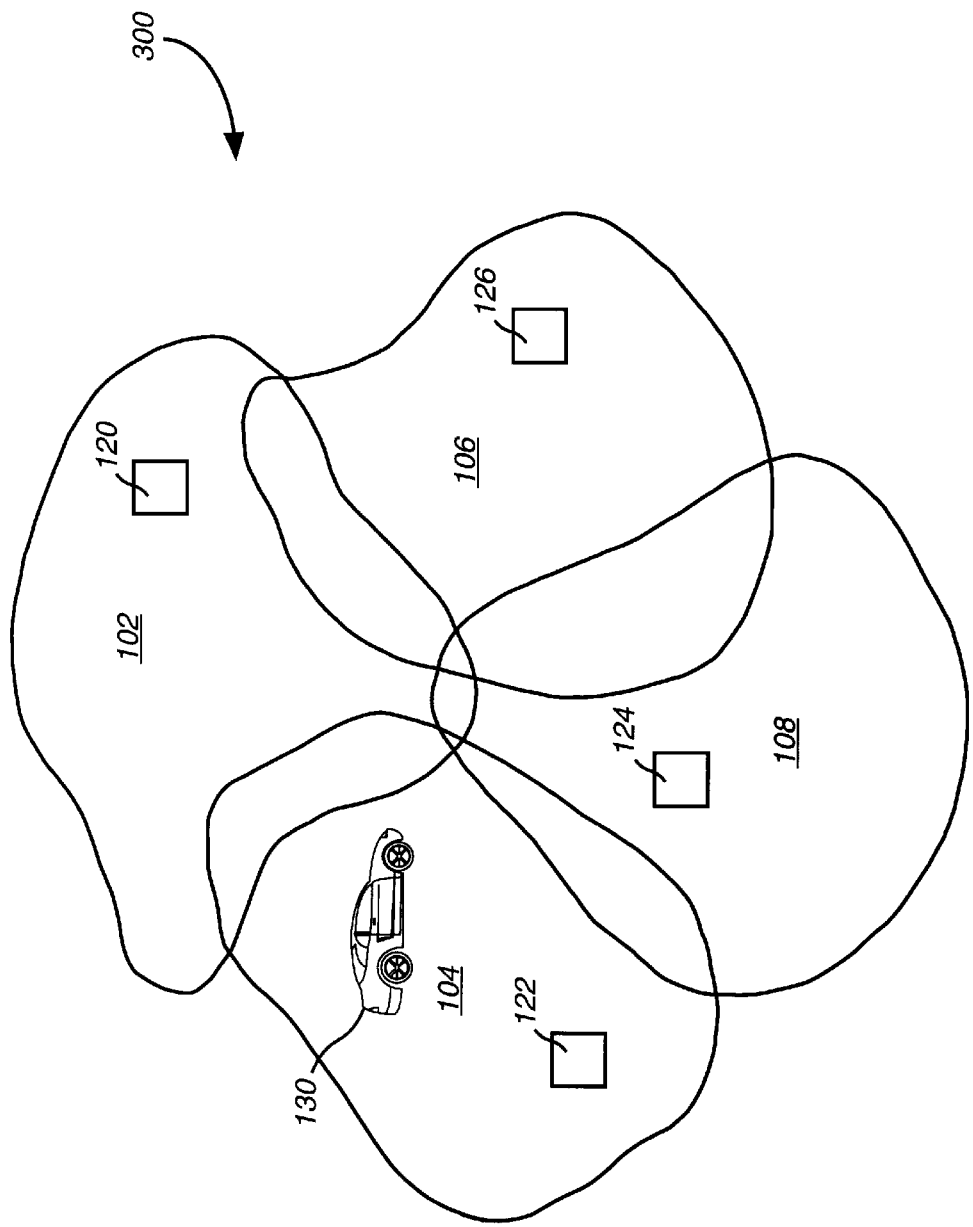
FIG. 3 illustrates an example of the operation of a preferred embodiment of the present invention.

FIG. 3 illustrates an example of the operation of the preferred embodiment of the present invention. In FIG. 3 it is assumed that a catastrophic degradation causes cell 110 in wireless network 100 to malfunction, resulting in no footprint for cell 110. Such a degradation can occur, for example, from a complete equipment failure in transceiver 128, thereby causing cell 110 to have no footprint.

In a conventional wireless network, there would be a "gap" in the coverage of wireless network 100. The gap would correspond to the coverage area of cell 110. Thus, in a conventional wireless network, users' calls in cell 110 are dropped. Even if network administrators become aware of the problem, implementing a solution in a conventional wireless network is time consuming because there is no mechanism or protocol for quickly responding to the degradation.

Unlike conventional wireless networks, the present invention provides the capability for fully automatic or partially automatic wireless network recovery.

The control mechanism 200 detects the degradation. The detection can arise from various sources including user complaints, equipment alarms, remote sensing equipment, and cell maintenance schedules.

Control mechanism 200 then assesses the impact on the wireless network. In this case, the impact is the loss of cell 110.

After assessing the loss, the control mechanism 200 identifies potential corrective actions. For example, control mechanism 200 can identify the corrective action of changing the footprint of neighboring cells 102, 104, 106, and 108 to provide coverage where cell 110 no longer can. Such a modification of cell footprints is illustrated in FIG. 3. In addition, control mechanism 200 can identify changing the handoff protocol to logically extend the coverage areas of neighboring cells 102, 104, 106, and 108. However, the logical extension of coverage area is not sufficient, by itself, to provide coverage for all of the area of cell 110. The control mechanism 200 can adjust frequency allocation or provide additional frequencies, if available, as necessary. As previously discussed, the control mechanism 200 must consider the effect of any modifications on frequency distribution.

Having identified potential corrective actions, the control mechanism 200 implements the corrective action. If more than one action is identified, the control mechanism 200 can implement some or all of the identified potential corrective actions. According to a preferred embodiment of the present invention, the control mechanism 200 can apply any identified corrective actions to a computer simulation prior to implementing them in a physical wireless network.

At this point, the wireless network has recovered from the network degradation. The recovery is illustrated graphically in FIG. 3. Accordingly, the control mechanism 200 returns to "begin" state 202 where it can await the next degradation to the wireless network 100. Thus, it is observed that control mechanism 200 provides for automatic, real-time adaptive wireless cell coverage in the wireless network 100. The adaptation occurs automatically in real-time.

Figure 4:
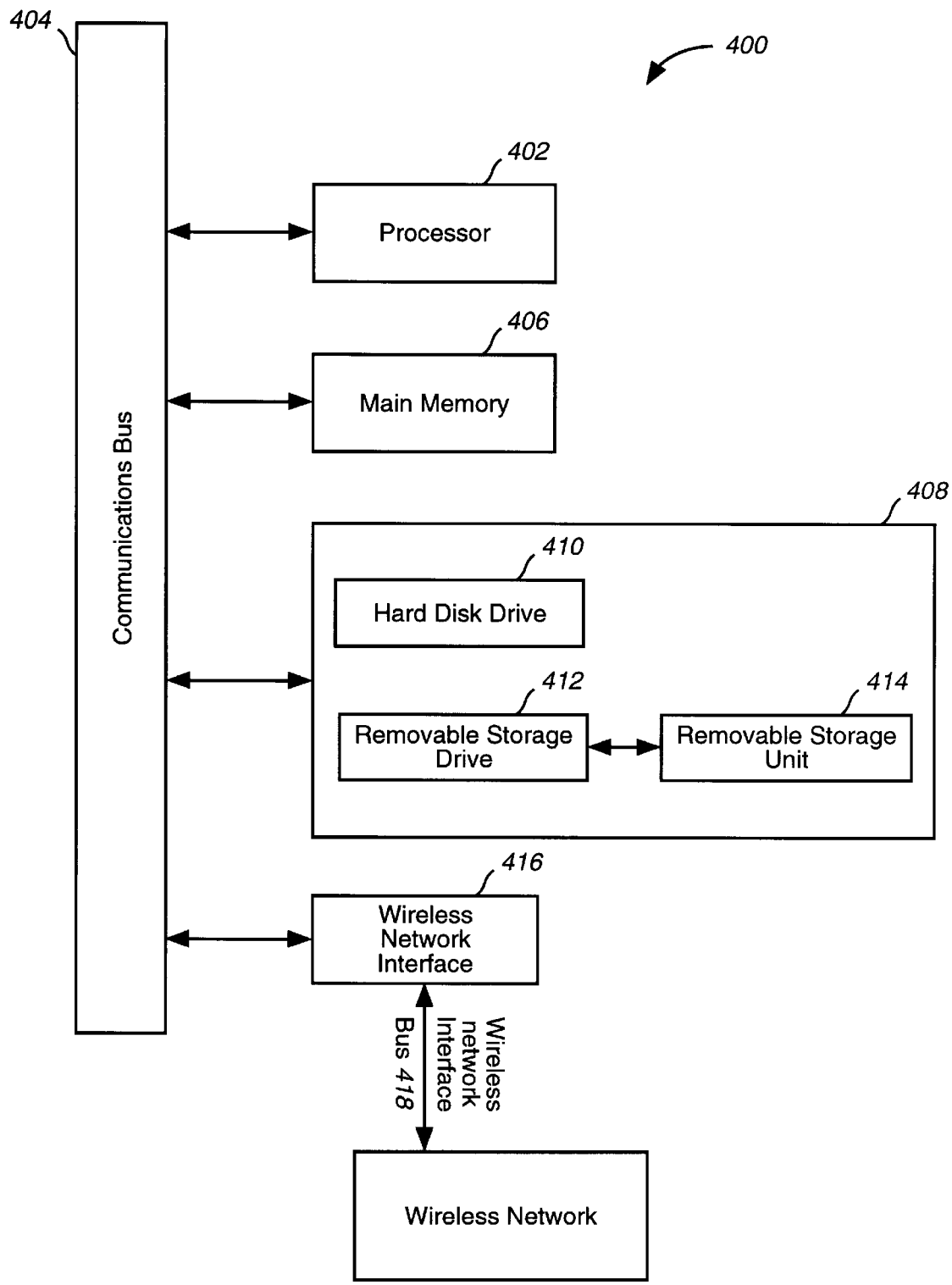
FIG. 4 illustrates a computer system 400 that can operate according to a preferred embodiment of the present invention.

In one embodiment, the invention is directed to a computer system operating as discussed herein. An exemplary computer system 400 is shown in FIG. 4. The computer system 400 includes one or more processors, such as processor 402. The processor is connected to a communication bus 404.

The computer system 400 also includes a main memory 406, preferably random access memory (RAM), and a secondary memory 408. The secondary memory 408 includes, for example, a hard disk drive 410 and/or removable storage drive 412, representing a floppy disk drive, magnetic tape drive, a compact disk, etc. The removable storage drive 412 reads from and/or writes to a removable storage unit 414 in a well known manner.

Removable storage unit 414, also called a program storage device or a computer program product, represents a floppy disk, magnetic tape, compact disk, etc. As will be appreciated by any person skilled in the art to which the present invention pertains, the removable storage unit 414, includes a computer useable storage medium having stored therein computer software and/or data.

The computer system 400 also includes a wireless network 100 interface 416. The wireless network interface 416 is coupled to the communication bus 404 and to a wireless network interface bus 418. The computer system 400 can control the wireless network 100 by inputting the status of the wireless network 100 over the wireless network interface bus 418 through the wireless network interface 416 and outputting control information through the wireless network interface 416 over the wireless network 100 interface bus 418.

Computer programs (also called computer control logic) are stored in main memory and/or the secondary memory 408. Such computer programs, when executed, enable the computer system 400 to perform the features of the present invention as discussed herein. In particular, the computer programs, when executed, enable the processor 402 to perform the features of the present invention. Accordingly, such computer programs represent controllers of the computer system 400.

In another embodiment, the present invention is directed to a computer program product comprising a computer readable medium having control logic (computer software) stored therein. The control logic, when executed by the processor 402, causes the processor 402 to perform the functions of the invention as described herein.

In another embodiment, the present invention is implemented primarily in hardware using, for example, a hardware state machine. Implementation of the hardware state machine so as to perform the functions described herein will be apparent to persons skilled in the art to which the present invention pertains.

Figure 5:
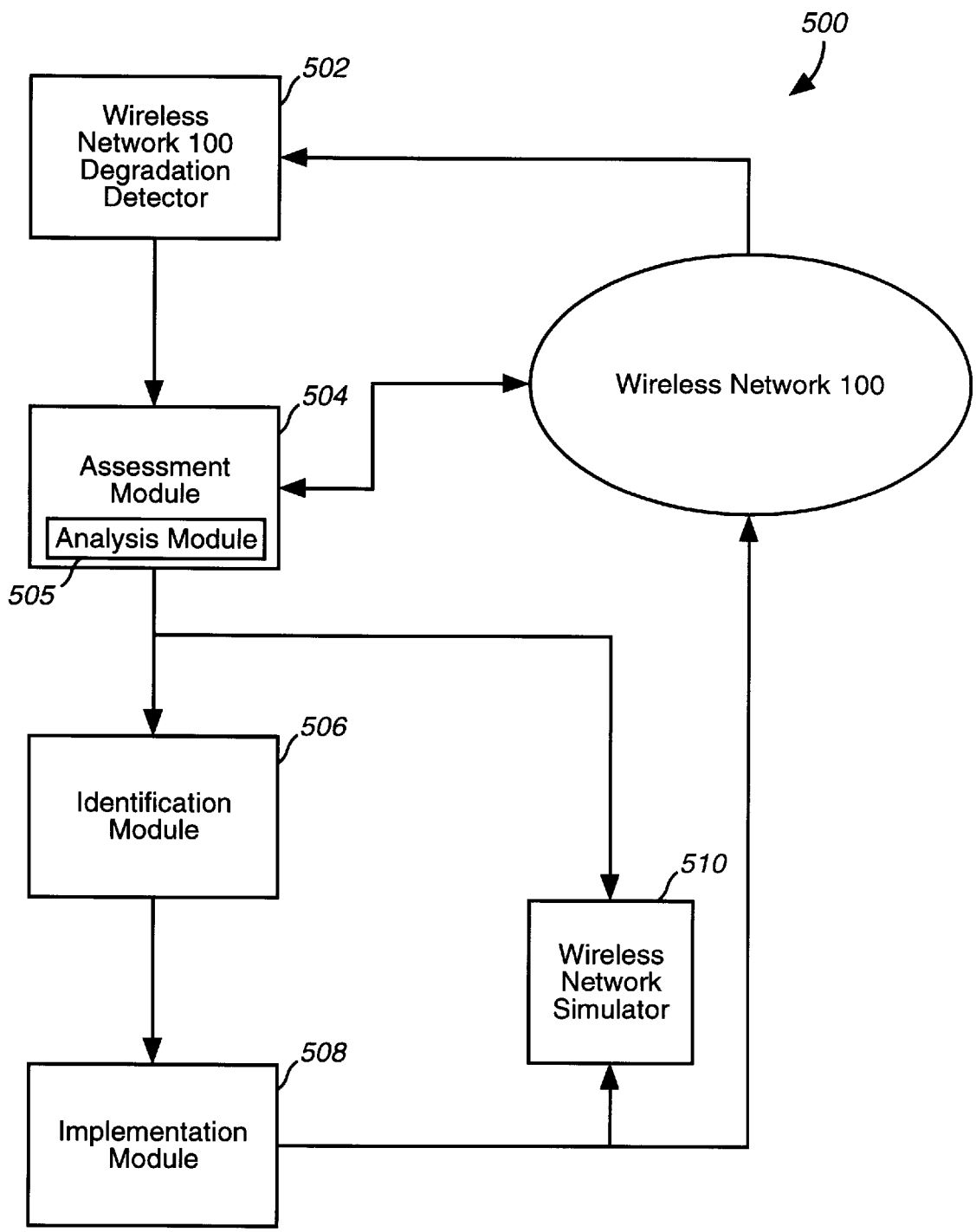
FIG. 5 illustrates a control system according to a preferred embodiment of the present invention.

A wireless network control system 500 constructed according to a preferred embodiment of the present invention is illustrated in FIG. 5. The wireless network control system comprises a wireless network degradation detector 502, an assessment module 504, an identification module 506, and an implementation module 508. In addition, the wireless network control system 500 can optionally include a wireless network simulator 510.

The degradation module 502 detects a degradation of the wireless network 100. The assessment module 504 assesses the impact of the degradation on the wireless network 100. The assessment module 504 preferably includes an analysis module 505 that can analyze performance inputs (discussed above) to make an assessment of the degradation's impact on the wireless network 100. As a result of the assessment, the identification module 506 identifies potential corrective actions to reduce or eliminate the degradation of wireless network 100. The implementation module 508 implements one or more corrective actions identified by the identification module 506. Each of the functions of the elements 502, 504, 506, and 508 of the wireless network control system 500 have been discussed in greater detail above.

A preferred embodiment of wireless network control system 500 includes a wireless network simulator 510. The wireless network simulator 510 is capable of simulating the coverage performance of wireless network 100. The wireless network simulator 510 can serve as a test bed to test potential corrective actions that are identified by the identification module 506. If the result of the test achieves a greater performance tha-n a predetermined performance level (discussed above), the implementation module 508 implements the identified potential corrective action. In this way, the wireless network simulator 510 can be used to reduce inefficient equipment adjustments in wireless network 100.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for performing automatic real-time adaptive wireless cell coverage in a wireless network to respond to a degradation of the wireless network, comprising the steps of:

(a) detecting the degradation of the wireless network by monitoring a plurality of performance inputs;
    (b) assessing an impact of the degradation of the wireless network;
    (c) identifying at least one potential corrective action from a plurality of potential corrective actions to reduce the impact of the degradation of the wireless network;
    (d) generating a model of the wireless network;
    (e) applying said at least one potential corrective action to said model prior to implementing said at least one potential corrective action in order to determine how said at least one potential action will affect the wireless network; and
    (f) implementing said at least one potential corrective action to reduce the impact of said degradation of the wireless network.

2. The method of claim 1, further comprising the step of repeating steps (a)–(f) until a predetermined performance level is achieved.

3. The method of claim 1, wherein step (a) further comprises the step of:

detecting a wireless network fault.

4. The method of claim 1, wherein step (a) further comprises the step of:

detecting an equipment fault in the wireless network.

5. The method of claim 1, wherein step (a) further comprises the step of:

detecting scheduled maintenance of the wireless network.

6. The method of claim 1, wherein step (a) further comprises the step of:

detecting changes in user traffic patterns in the wireless network.

7. The method of claim 1, wherein step (b) further comprises the steps of:

accepting at least one performance input including user inputs, equipment alarm indicators, traffic pattern indicators, and remote radio test equipment data;
    analyzing said at least one performance inputs to determine said impact.

8. The system of claim 1, wherein said plurality of potential corrective actions includes one or more of:

adjusting cell site controls for adjusting a footprint of a cell;
    adjusting soft controls for adjusting a virtual footprint of a cell; and
    adjusting frequency controls for redistributing communication frequencies or adding communication frequencies within a cell.

9. The method of claim 1, wherein said plurality of performance inputs includes at least one of:

traffic performance indicators for determining the effect of user traffic patterns;
    equipment alarms for identifying malfunctioning equipment;
    remote radio test equipment for determining the effectiveness of cell coverage; and
    user inputs for indicating geographic locations experiencing service problems.

10. The method of claim 1, wherein said at least one potential corrective action includes at least one of modification of a cell footprint, modification of a cell-handover protocol to provide a "virtual" change to a cell footprint, and redistributing frequency allocation.

11. The method of claim 1, wherein step (f) further comprises the steps of:

selecting one of said at least one potential corrective actions identified in step (c) such that active traffic is not dropped and said one of said at least one potential corrective actions is completed in real-time.

12. A system for performing automatic real-time adaptive wireless cell coverage in a wireless network to respond to a degradation of the wireless network, the degradation causing the performance of the wireless network to deviate from a predetermined performance level, comprising:

a wireless network degradation detector for detecting the degradation of the wireless network by monitoring a plurality of performance inputs;

an assessment module for assessing an impact of said degradation of the wireless network;

an identification module for identifying at least one potential corrective action from a plurality of potential corrective actions to reduce the impact of said degradation of the wireless network;

a computer simulator that generates a model of the wireless network and is configured to receive as an input said at least one potential corrective action, wherein said computer simulator applies said at least one potential corrective action to said model in order to determine how said at least one potential action will affect the wireless network; and an implementation module for implementing said at least one potential corrective action to reduce the impact of said degradation of the wireless network.

13. The system of claim 12, wherein said wireless network degradation detector detects one or more of a wireless network fault, a wireless network equipment fault, and changes in user traffic patterns.

14. The system of claim 12, wherein said assessment module further comprises
at least one input node for inputting at least one performance input; and
an analysis module for analyzing said at least one performance input.

15. The system of claim 14, wherein said at least one performance input is one of a user feedback, an equipment alarm indication, a traffic pattern indication, and remote radio test data.

16. The system of claim 11, wherein said potential corrective actions include modification of a cell footprint, modification of a cell handoff protocol, thereby providing a "virtual" change to a cell footprint, and redistribution of frequency allocation.

17. The system of claim 11, wherein said implementation module selects one of said at least one potential corrective actions such that call traffic is not dropped and said one of said at least one potential corrective actions is completed in a timely manner.

18. The method of claim 1, wherein step (a) includes an evaluation of at least one of user complaints, equipment alarms, equipment performance, special event scheduling and environmental changes.

19. The method of claim 1, further comprising the step of assessing the impact of implementing said at least one corrective action and repeating step (f) with another potential corrective action until a predetermined performance level is achieved.

20. The method of claim 1, wherein step (e) generates a numeric metric of how said at least one potential action will affect the wireless network, wherein step (e) further comprises comparing said numeric metric against a predetermined value, wherein if said numeric metric is less than said predetermined value said at least one potential corrective action is not implemented.

21. The system of claim 1, wherein said assessment module assesses the impact of implementing said at least one corrective action and triggers said implementation module to apply another potential corrective action until the predetermined performance level is achieved.

22. The system of claim 11, wherein said wireless network degradation detector evaluates at least one of user complaints, equipment alarms, equipment performance, special event scheduling and environmental changes.

23. The system of claim 11, wherein said computer simulator generates a numeric metric of how said at least one potential action will affect the wireless network and compares said numeric metric against a predetermined value, wherein if said numeric metric is less than said predetermined value said at least one potential corrective action is not implemented by said implementation module.

24. The system of claim 12, wherein said plurality of potential corrective actions includes one or more of:
adjusting cell site controls for adjusting a footprint of a cell;
adjusting soft controls for adjusting a virtual footprint of a cell; and
adjusting frequency controls for redistributing communication frequencies or adding communication frequencies within a cell.

25. The system of claim 12, wherein said plurality of performance inputs includes at least one of:
traffic performance indicators for determining the effect of user traffic patterns;
equipment alarms for identifying malfunctioning equipment;
remote radio test equipment for determining the effectiveness of cell coverage; and
user inputs for indicating geographic locations experiencing service problems.

26. A system for performing automatic real-time adaptive wireless cell coverage in a wireless network to respond to a degradation of the wireless network, the degradation causing the performance of the wireless network to deviate from a predetermined performance level, comprising:

a wireless communication network employing a communication technology of code division multiple access (CDMA), time division multiple access (TDMA) or frequency division multiple access;

a wireless network degradation detector for detecting the degradation of the wireless network by monitoring a plurality of performance inputs;

an assessment module for assessing an impact of said degradation of the wireless network;

an identification module for identifying at least one potential corrective action from a plurality of potential corrective actions to reduce the impact of said degradation of the wireless network;

a computer simulator that generates a model of the wireless network and is configured to receive as an input said at least one potential corrective action, wherein said computer simulator applies said at least one potential corrective action to said model in order to determine how said at least one potential action will affect the wireless network; and an implementation module for implementing said at least one potential corrective action to reduce the impact of said degradation of the wireless network.

27. The system of claim 26, wherein said plurality of performance inputs includes at least one of:
traffic performance indicators for determining the effect of user traffic patterns;
equipment alarms for identifying malfunctioning equipment;
remote radio test equipment for determining the effectiveness of cell coverage; and user inputs for indicating geographic locations experiencing service problems.

28. The system of claim 26, wherein said plurality of potential corrective actions includes one or more of:

adjusting cell site controls for adjusting a footprint of a cell;

adjusting soft controls for adjusting a virtual footprint of a cell;

adjusting frequency controls for redistributing communication frequencies or adding communication frequencies within a cell.

* * * * *